(12) United States Patent
Plonka (10) Patent No.: US 6,545,648 B1
(45) Date of Patent: Apr. 8, 2003

(54) ADAPTIVE CONTROL OF RF RECEIVING ANTENNA SYSTEM FOR DIGITAL TELEVISION

(75) Inventor: Robert J. Plonka, Quincy, IL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/606,930

(22) Filed: Jun. 29, 2000

Related U.S. Application Data

(63) Continuation-in-part of application No. 09/266,106, filed on Mar. 10, 1999, now Pat. No. 6,172,652.

(51) Int. Cl.⁷ .............................. H01Q 21/06; G01S 3/16
(52) U.S. Cl. ........................................ 343/853; 455/33
(58) Field of Search ................................ 343/853, 725, 343/729; 370/18; 342/359; 455/33, 51

(56) References Cited

U.S. PATENT DOCUMENTS

| | | | | |
|---|---|---|---|---|
| 4,696,051 A | * | 9/1987 | Breeden | ...................... 455/33 |
| 5,463,403 A | | 10/1995 | Walker et al. | ............. 342/359 |
| 5,533,011 A | * | 7/1996 | Dean et al. | ................... 370/18 |

FOREIGN PATENT DOCUMENTS

| | | |
|---|---|---|
| EP | 0991134 | 4/2000 |
| WO | 0001033 | 1/2000 |

* cited by examiner

Primary Examiner—Don Wong
Assistant Examiner—James Clinger
(74) Attorney, Agent, or Firm—Tarolli, Sundheim, Covell & Tummino L.L.P.

(57) ABSTRACT

An antenna system for receiving horizontal and vertical components of a transmitted horizontally polarized digital RF signal. The system includes a vertical antenna for primarily receiving vertical components of the RF signal and a horizontal antenna primarily for receiving the horizontal components of the RF signal. An adjustable time delay changer is provided for adjusting any time delay of one of the components. A combiner combines the components to obtain therefrom a combined RF signal for application to an RF utilization means. The combined RF signal is a digital signal exhibiting a bit error rate dependent upon the value of the vertical component. An RF decoder decodes the bit error rate and provides a bit error rate signal having a value that varies as a function of the value of the bit error rate. An adaptive controller responds to the bit error rate signal and adjusts the time delay changer in a direction to decrease the value of said bit error rate signal.

21 Claims, 6 Drawing Sheets

ADAPTIVE CONTROL OF RF RECEIVING ANTENNA SYSTEM FOR DIGITAL TELEVISION

This is a continuation in part of U.S. patent application, Ser. No. 09/266,106, filed Mar. 10, 1999 now U.S. Pat. No. 6,172,652.

BACKGROUND OF THE INVENTION

1. Technical Field

The present invention relates to antenna systems and, more particularly, to adaptive control of an antenna system particularly applicable for use in receiving digital RF signals for digital television (DTV).

2. Description of the Prior Art

In the United States, the Federal Communications Commission (FCC) has established guidelines for broadcasting television signals. The established standard is known as the NTSC signal format which is an analog signal. The FCC is now permitting the broadcasting of digital television (DTV) as well as analog NTSC signals.

The digital television signals (DTV) being broadcast at this time are horizontally polarized signals. Circular polarized signals (CP) are being considered for future broadcasting of digital television signals. A problem noted with such horizontally polarized DTV signals arises in urban centers having tall buildings. The DTV signal may reflect off one or more buildings prior to being received at a subscriber's receiving antenna. If the receiving antenna is a "rabbit ear" di-pole antenna, the received signal may be comprised of the horizontal component (from the broadcasted horizontally polarized DTV signal) as well as a vertical component (the result of reflection). The reflected vertical component may lead or lag the horizontal component in time and be offset therefrom in phase, resulting in an erroneous "ghosting" signal being fed to the subscriber's DTV television receiver. The result will be a garbled picture on the television receiver.

It is understood that the same result will take place if the broadcasted signal is circularly polarized (CP). Such a signal, when received at a receiving antenna, will include a horizontal component and a vertical component together with a vertical reflection component and a horizontal reflection component resulting in erroneous signals being fed to the DTV television receiver.

SUMMARY OF THE INVENTION

An antenna system for receiving horizontal and vertical components of a transmitted horizontally polarized digital RF signal. The system includes a vertical antenna for primarily receiving vertical components of the RF signal and a horizontal antenna primarily for receiving the horizontal components of the RF signal. An adjustable time delay adjuster is provided for adjusting any time delay of one of the components. A combiner combines the components to obtain therefrom a combined RF signal for application to an RF utilization means. The combined RF signal is a digital signal exhibiting a bit error rate dependent upon the value of the vertical component. An RF decoder decodes the bit error rate and provides a bit error rate signal having a value that varies as a function of the value of the bit error rate. An adaptive controller responds to the bit error rate signal and adjusts the time delay adjuster in a direction to decrease the value of the bit error rate signal.

BRIEF DESCRIPTION OF THE DRAWINGS

The foregoing and other objects and advantages of the present invention will become more readily apparent from the following as taken in conjunction with the accompanying drawings wherein.

DESCRIPTION OF PREFERRED EMBODIMENTS

Figure 1:
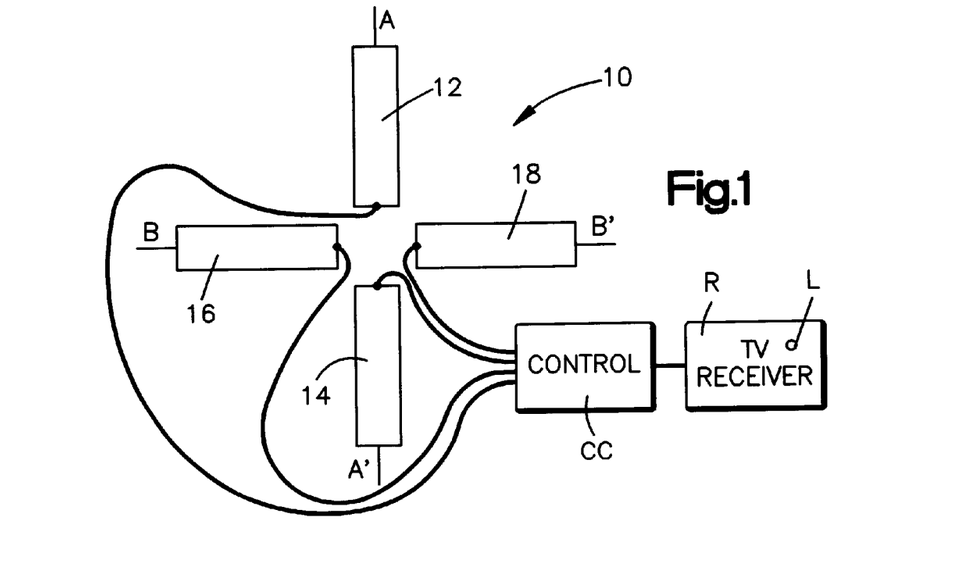
FIG. 1 is an elevational view of a circular polarized antenna together with a block diagram illustration of accompanying circuitry.

Reference is now made to the drawings herein wherein the showings are for purposes of illustrating the preferred embodiments of the invention only and not for limiting same. FIG. 1 illustrates an antenna system in accordance with the invention wherein the antenna system includes a circular polarized antenna 10 having a pair of vertically oriented di-pole elements 12 and 14 and a pair of horizontally oriented di-pole elements 16 and 18. The antenna may be rotated about the vertical axis A–A' extending through elements 12 and 14, if desired. Also, the antenna may be rotated about the horizontal axis B–B' extending through the horizontal elements 16 and 18, if desired. The RF signals received by the vertically oriented di-pole elements 12 and 14 are primarily the vertical components of the RF signal whereas the signals received by the horizontal di-pole elements 16 and 18 are primarily the horizontal components of the RF signal.

As will be brought out hereinafter, it is contemplated that the antenna 10 will be employed for receiving horizontally polarized signals which have been transmitted from a broadcasting antenna such as that which may be broadcasting digital television (DTV) signals. In an urban atmosphere, large buildings may interfere with the reception of such horizontally polarized signals because the signals may be reflected by various buildings resulting in the signals being received with horizontal components together with reflections which are received as vertical components. This may cause "ghosting", resulting in picture loss at the subscriber's TV receiver.

It is contemplated that the antenna 10 be connected to a control circuit CC that minimizes the vertical components so that mostly the horizontal components of the horizontally polarized signal are supplied by the control circuit CC to a subscriber's digital TV receiver R. Such TV receivers will typically employ adaptive equalizers which are capable of correcting for some of the discrepancies, such as some of the vertical reflection components. However, minimizing the vertical reflection components will assure that such equalizers will provide a proper picture for the receiver R. It is contemplated that in addition to such an equalizer, the receiver is provided with a pilot light L which is illuminated whenever a pilot signal is detected. This can be accomplished by rotating the antenna 10 about either the axis A–A' or B–B' for tuning the receiver.

Figure 2:
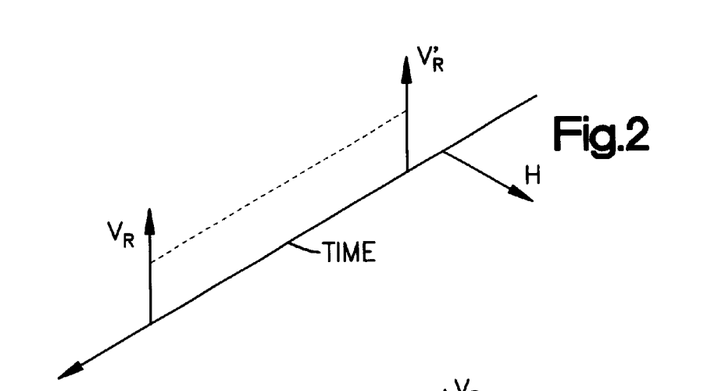
FIG. 2 is a vector diagram illustrating the received horizontal component of the RF signal together with a reflected vertical component which is displaced in time from that of the horizontal component.

Reference is now made to FIG. 2 which is a vector diagram illustrating the horizontal component H of the received signal at the antenna system 10 in response to the broadcasting of a horizontally polarized signal. The vertical component is the result of a reflection between the transmitting antenna and the receiving antenna 10 as indicated by the vertical reflection component $V_R$. It is to be noted that this reflection component $V_R$ is spaced in time from the horizontal component H. In accordance with the present invention adjustments are made so that the vertical component is displaced in time toward that of the horizontal component at approximately the position of vertical component $V_R'$. The adjusted vertical component is still displaced in phase from that of the horizontal component H. Accordingly, in accordance with another aspect of the present invention, the adjusted component $V'_R$ is rotated toward the horizontal component so that when these components are combined there will result a useful, essentially horizontal component to be delivered to the receiver R.

Figure 3:
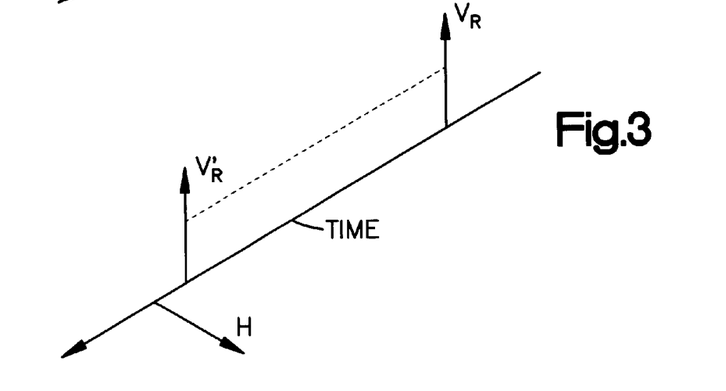
FIG. 3 is a vector diagram similar to that of FIG. 2 wherein the reflected vertical component is displaced in time from the horizontal component.

FIG. 3 is similar to that of FIG. 2 but illustrates a second condition wherein the reflected vertical component $V_R$ is spaced in time from the horizontal component H. The control CC in accordance with the invention is employed for displacing the vertical component $V_R$ toward the location of component $V'_R$ and then this adjusted component $V_R'$ is rotated toward that of the component H.

Figure 5:
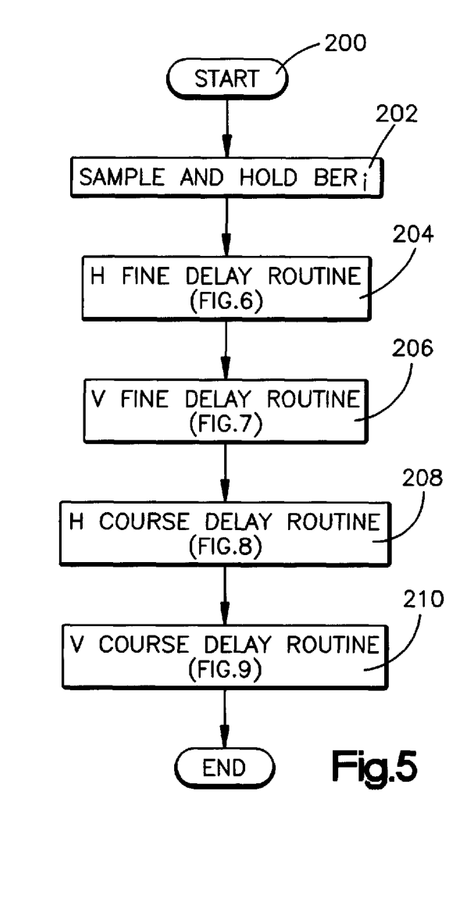
FIG. 5 is a flow diagram involved in the invention.

Reference is now directed to FIG. 5 which illustrates the control circuit CC in greater detail. Also, the vertical antenna elements 12, 14 and the horizontal antenna elements 16, 18 are illustrated as being spaced from each other for purposes of simplification. It is to be understood that the antenna elements are normally positioned as is illustrated in FIG. 1.

The vertical antenna elements 12 and 14 are connected by way of a balun 50 to an adjustment path including a fine delay adjuster 52 and a course delay adjuster 54 and thence to port A of a 90° hybrid combiner 56. The balun includes a transformer 58 having a primary winding 60 connected between antenna elements 12 and 14 and a secondary winding 62 connected between ground and the delay adjuster 52.

The horizontal di-pole elements 16 and 18 are also connected to a balun 70 which includes a transformer 72 having a primary winding 74 connected to elements 16 and 18 and secondary winding 76. The secondary winding 76 is connected between ground and an adjustment path including a fine delay adjuster 78 and a course delay adjuster 80. The delay adjuster 80 is connected to the B port of the hybrid combiner 56. The C port of the hybrid combiner 56 is connected to a reject load 82 and the D port provides an output signal which may be applied to a digital television. The delay adjusters 52, 54, 78 and 80 may each take the form of a multi-tap delay line. It is to be noted that the fine time delay or fine delay as described herein may be considered as phase delay.

Additionally, the control circuit CC includes a digital RF decoder which receives the digital RF signal from port D of the hybrid 56. The digital RF signal received from port D of the hybrid combiner 56 may be of the current transmission standard, known as 8-VSB or may be another digital coded signal, known as QUAM. This decoder 100 may be separate from or be included within a digital television receiver R. The decoder 100 receives the digital RF signal and provides a decoded output signal which includes information representative of the bit error rate of the received digital signal. The bit error rate BER is indicative of the quality of the incoming digital RF signal. The quality of the signal may be low because, for example, the transmitted horizontally polarized signal is reflected off one or more obstructions before reaching the receiving antenna 10. In such case, the received signal will include vertical components of the RF signal due to the reflections. If the bit error rate is sufficiently low, the quality of the received signal will suffice for proper operation of the digital television receiver R. If the bit error rate BER is too high, the quality of the incoming digital RF signal may be sufficiently poor that the digital TV receiver will not operate properly. Consequently, it is important to determine the value of the bit error rate and provide adjustments to maintain a minimum bit error rate.

In accordance with the present invention, a bit error rate decoder 110 is connected to the output of decoder 100 to provide an output signal having a value which varies as a function of the bit error rate BER. This signal is supplied to the controller 112 which as will be described here below, provides both horizontal and vertical control signals to the controls 114 and 116 which then respectively control the phase and delay adjustments for the vertical and horizontal phase and delay adjusters. The controller 112 preferably takes the form of a programmed microprocessor which is programmed to perform the functions to be described below with reference to the flow diagrams herein. The controller 112 may also take the form of a programmed logic array (PLA) or logic circuits. The controller provides adaptive control in response to the decoded bit error rate.

Figure 4:
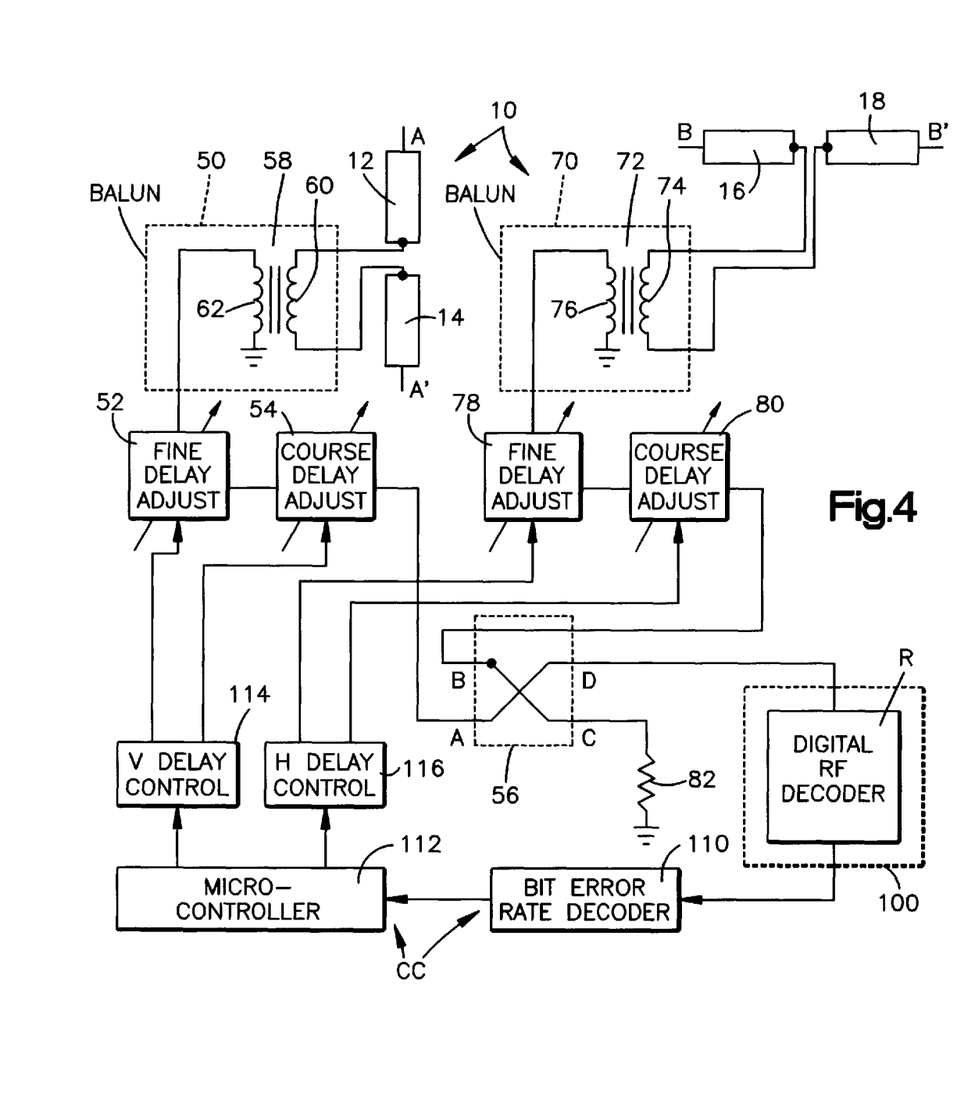
FIG. 4 is a schematic-block diagram illustration of one embodiment of the receiving system in accordance with the invention herein.

Reference is now made to FIG. 5 which is a simplified flow diagram illustration as to the manner in which the microprocessor in the controller 112 is programmed. More specific details of the routines is presented in the FIGS. 6, 7, 8 and 9. The procedure commences with a start step 200 and advances to a sample and hold step 202 during which the initial value of the bit error rate signal $BER_i$ is obtained from the decoder 110 (FIG. 4) and held as a reference. The procedure then advances to step 204 which is the horizontal fine delay adjustment routine to be described hereinafter with reference to FIG. 6. During this routine, which will be described hereinafter, the microcontroller is programmed to compare the succeeding bit error rate signals $BER_1$ through $BER_N$ with the initial bit error rate signal $BER_i$ or with the immediately preceding bit error rate signal BER(N−1). Depending upon the results, adjustments are made to the fine delay and course delay adjusters associated with the horizontal antenna elements 16 and 18. If it is determined that the bit error rate has not been sufficiently reduced, the procedure advances to the vertical fine delay routine 206 illustrated in FIG. 7. There, a similar procedure takes place. Thereafter, if the bit error rate has not been sufficiently reduced, the procedure advances to a horizontal course delay routine 208 illustrated at FIG. 8 and thereafter to a vertical course delay routine 210 illustrated in FIG. 9. It is contemplated that the adjustments will be made one increment at a time. The horizontal and vertical fine delay adjustments are considered fine adjustments and each adjustment increment is on the order of 12 nanoseconds. The horizontal and vertical course delay adjustments are considered coarse adjustments and each adjustment increment is on the order of 96 nanoseconds. After the fine and course horizontal and vertical delay adjustments are made, the signals are combined in the hybrid combiner 56. The vertical components applied to port A are rotated 90 degrees to agree with the horizontal component so that the output form port D is mainly horizontal. The main vertical components and some 90 degree shifted and attenuated horizontal components are applied to the reject load 82.

Figure 6A:
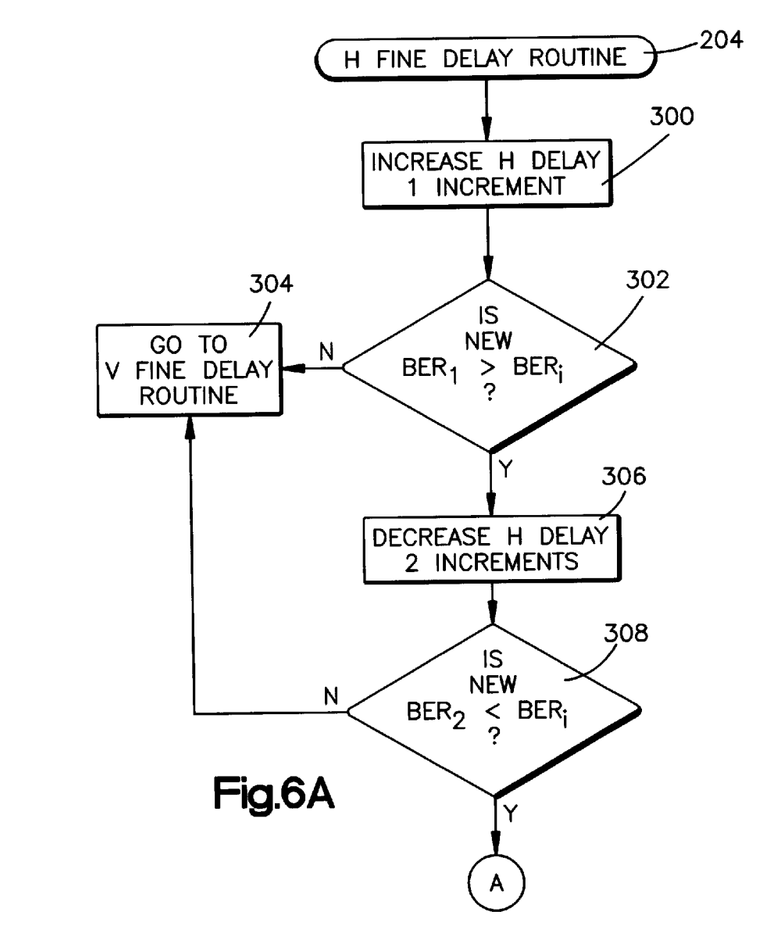
FIG. 6 is a flow diagram of one routine involved in the invention.
Figure 6B:
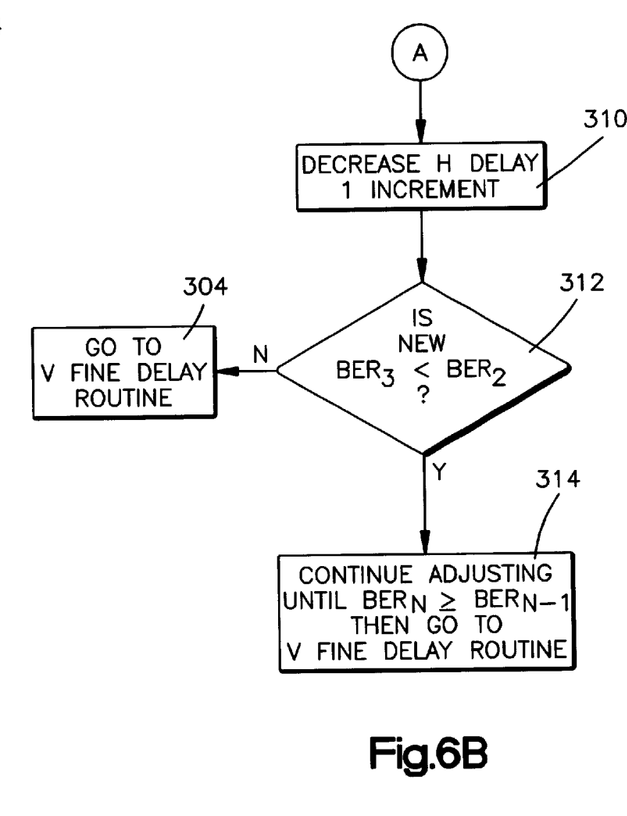

Reference is now made to FIG. 6 which illustrates the horizontal phase adjustment routine 204 in greater detail. The procedure advances to step 300 during which the horizontal component time delay is increased by operating the horizontal fine delay adjuster 78 to increase the horizontal time delay by one increment. This will cause a change in the quality of the digital RF signal that is supplied to decoder 100 and hence, the bit error rate will change from the initial value $BER_i$ to a new value $BER_1$.

Figure 7A:
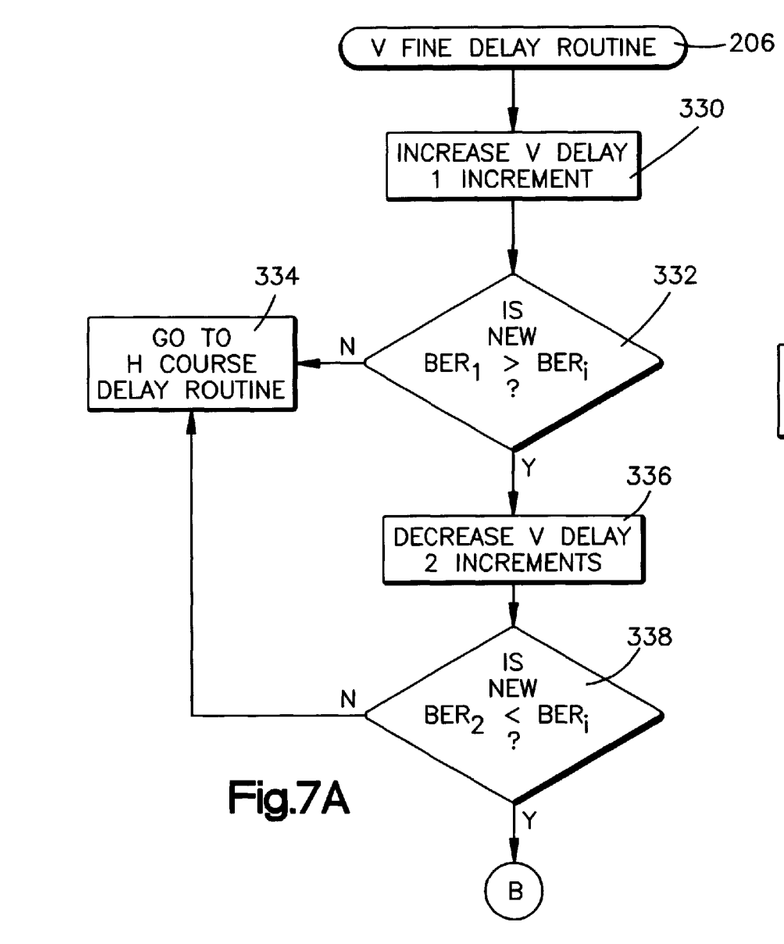
FIG. 7 is a flow diagram of another routine involved in the invention.
Figure 7B:
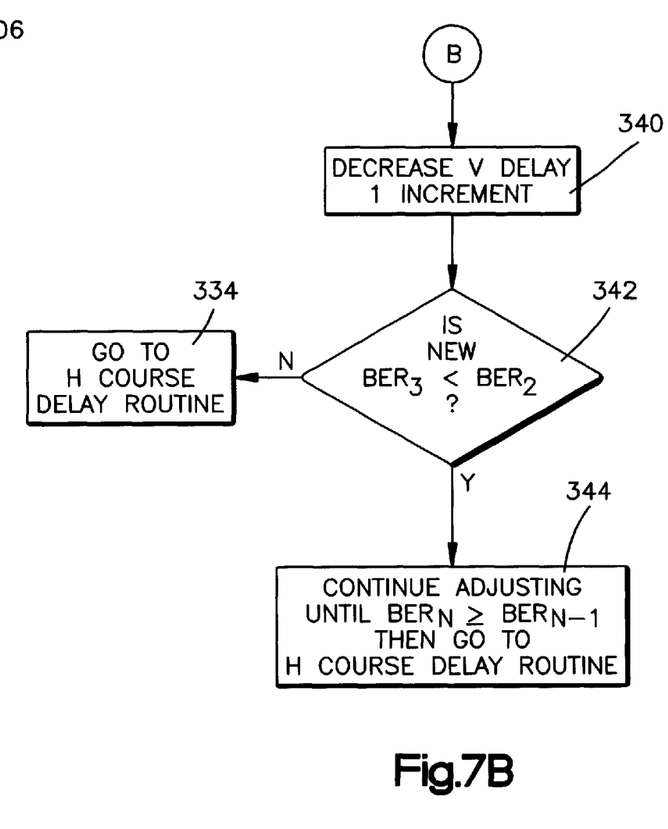

At step 302 a determination is made as to whether the new bit error rate $BER_1$ is greater than the initial bit error rate $BER_i$. If not, the procedure advances to step 304 during which the procedure advances to the vertical fine delay routine 206 (FIG. 7). If the new bit error rate $BER_1$ is greater than the initial bit error rate $BER_i$, the procedure advances to step 306.

In step 306 the horizontal fine delay adjuster 78 is manipulated to decrease the horizontal delay by two increments causing a change to a new bit error rate $BER_2$.

The procedure advances to step 308 at which a determination is made as to whether the new bit error rate $BER_2$ is less than the initial bit error rate $BER_i$. If not, the procedure advances to step 304 and, thence, to the vertical fine delay routine (FIG. 7).

If in step 308 a determination is made that the new bit error rate $BER_2$ is less than the initial bit error rate $BER_i$, the procedure advances to step 310. In this step, the horizontal time delay adjuster 78 is adjusted to decrease the time delay by one increment. This should cause a new bit error rate $BER_3$.

Figure 8A:
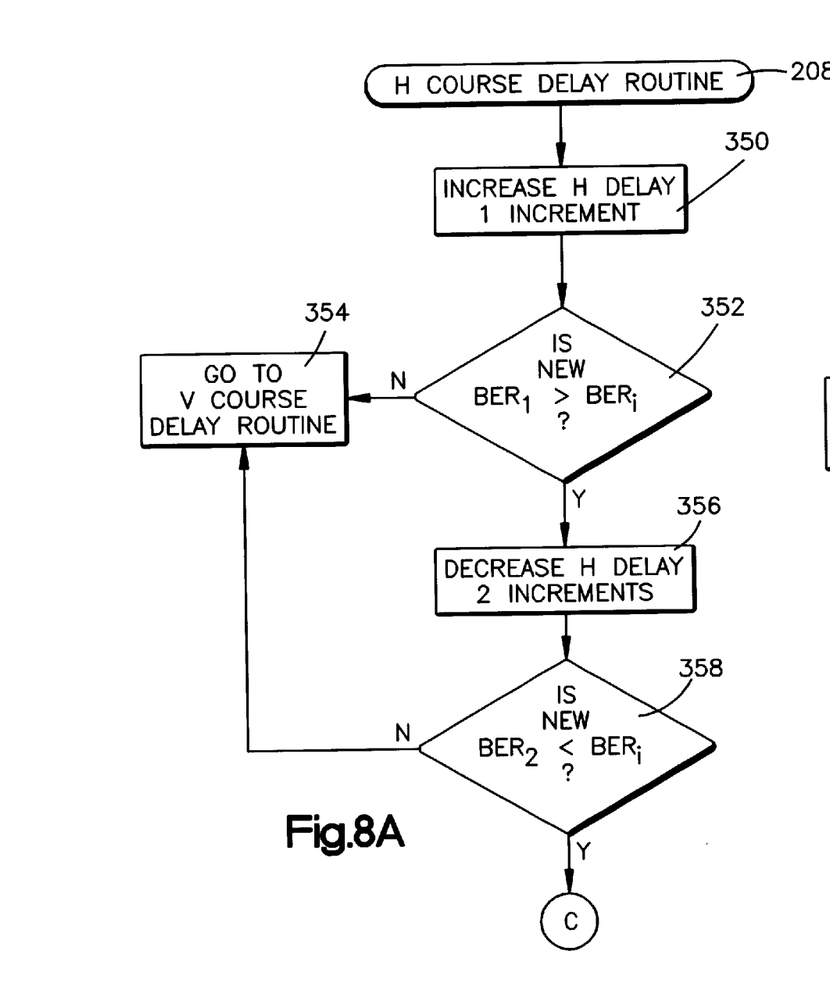
FIG. 8 is a flow diagram of another routine involved in the invention.
Figure 8B:
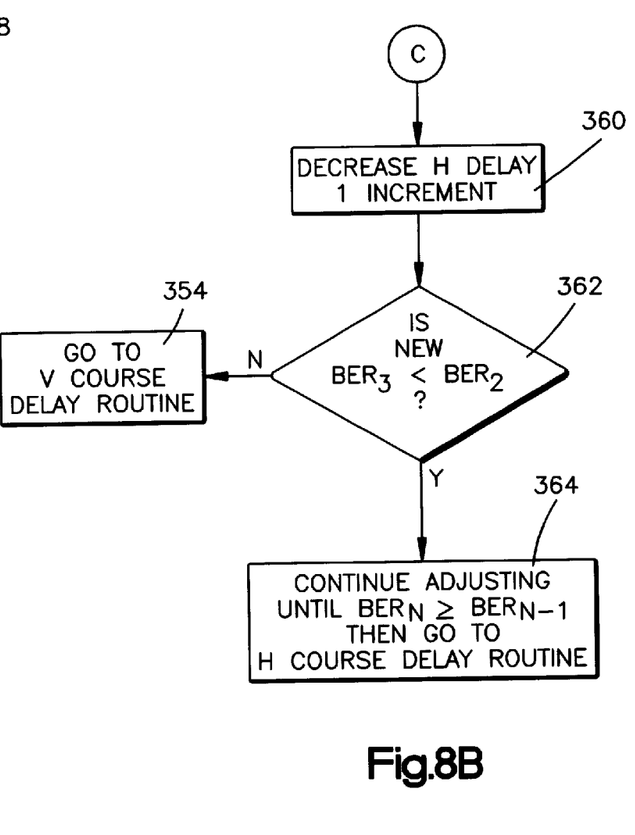

In step 312 a determination is made as to whether the new bit error rate $BER_3$ is less than the previous bit error rate $BER_2$. If not, the procedure advances to step 304 and, thence, to the vertical delay routine (FIG. 8).

If the new bit error rate $BER_3$ is less than the previous bit error rate $BER_2$, the procedure advances to step 314. In step 314 the procedure continues to incrementally decrease the horizontal fine delay until the most recent bit error rate $BER_N$ is equal to or greater than the last preceding bit error rate $BER_{N-1}$ at which time the procedure will advance to the vertical fine delay routine (FIG. 7).

Attention is now directed to the flow diagram in FIG. 7 which illustrates the manner in which the microcontroller 112 is programmed to perform the vertical fine delay routine 206. This routine is similar to the horizontal phase routine 204. In this routine, the vertical adjuster 52 is operated to increase the vertical delay by one increment in step 330. This should cause a new bit error rate $BER_1$.

The procedure advances to step 332 during which a determination is made as to whether the new bit error rate $BER_1$ is greater than the initial bit error rate $BER_i$.

It is to be understood in this routine that the initial bit error rate $BER_i$ is the initial bit error rate as the vertical fine delay routine is entered into. Similarly the succeeding bit error rates $BER_1$ through $BER_N$ are the adjusted bit error rates during the vertical fine delay routine. These bit error rates are not intended to be confused with the bit error rates described hereinbefore with reference to the horizontal fine delay routine. The initial bit error rate $BER_i$ during the vertical fine delay routine is equal to the value of the last bit error rate obtained during the horizontal fine delay routine.

If the bit error rate $BER_1$ obtained in the vertical fine delay routine is not greater than the initial bit error rate $BER_i$, the procedure advances to step 334 for the horizontal course delay routine (FIG. 8). If the bit error rate $BER_1$ is greater than the initial bit error rate $BER_i$, the procedure advances to step 336.

In step 336 the phase adjuster 52 is operated in a manner to decrease the vertical delay by two increments. This should result in a new bit error rate $BER_2$.

In step 338 a determination is made as to whether the new bit error rate $BER_2$ is less than the initial bit error rate $BER_i$. If not, the procedure advances to step 334 as noted above.

If in step 338 a determination is made that the new bit error rate $BER_2$ is less than the initial bit error rate $BER_i$, the procedure advances to step 340.

In step 340 the adjuster 52 is operated in a manner to decrease the vertical delay by one increment. This should result in a new bit error rate $BER_3$.

In step 342 a determination is made as to whether the new bit error rate $BER_3$ is less than the previous bit error rate $BER_2$. If not, the procedure advances to step 334 as described above.

If the bit error rate $BER_3$ is less than the bit error rate $BER_2$ in step 342, the procedure advances to step 344. Step 344 is similar to step 314 (FIG. 6) and the procedure of adjusting the vertical fine delay adjuster 52 continues in incremental fashion until a determination is made that the new bit error rate $BER_N$ is equal to or greater than $BER_{N-1}$. At that time, the procedure advances to the horizontal course delay routine.

Reference is now made to the flow diagram of FIG. 8 which illustrates the horizontal course delay routine 208. In this routine the horizontal delay adjuster 80 is operated at step 350 in a direction to cause a delay of one increment. This results in a new bit error rate. As discussed hereinbefore with reference to FIGS. 7 and 8, the new bit error rate for the horizontal delay routine will be referred to as bit error rate $BER_1$ and the initial bit error rate $BER_i$ may have a value corresponding with the last bit error rate in the previous routine 206.

Figure 9A:
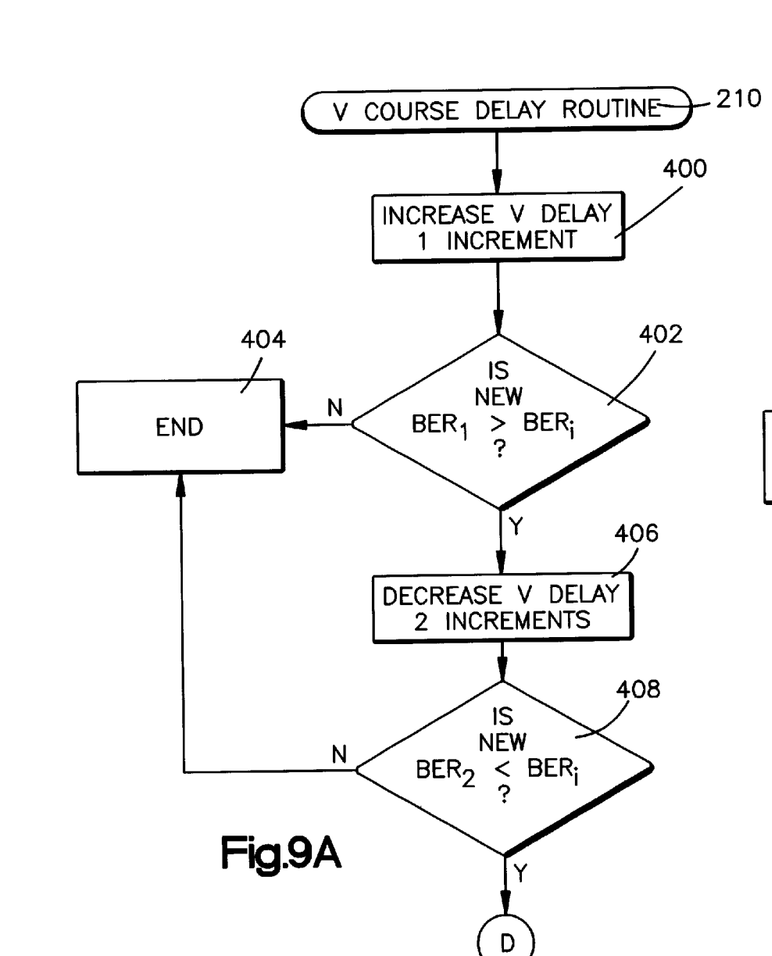
FIG. 9 is a flow diagram of another routine involved in the invention.
Figure 9B:
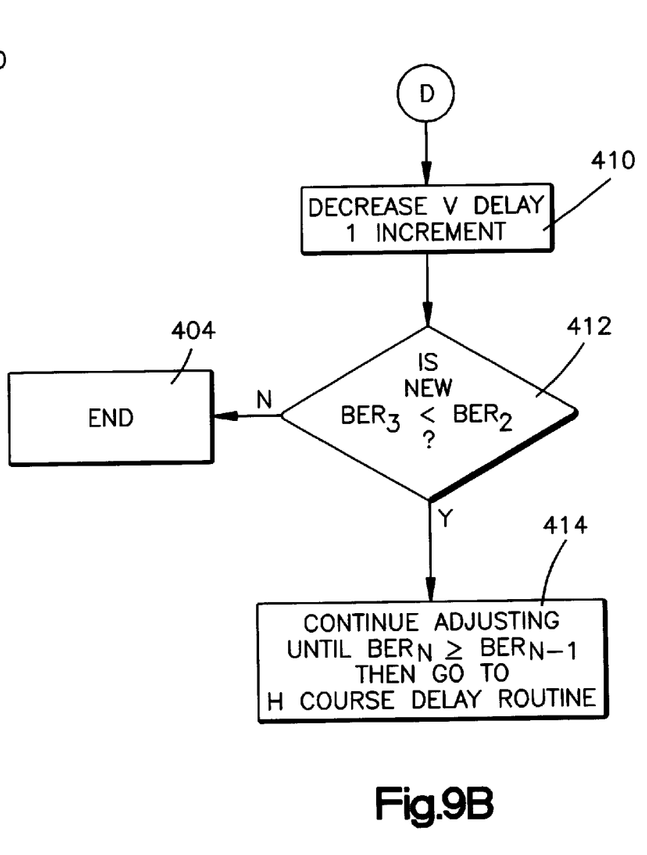

In step 352, a determination is made as to whether the new bit error rate $BER_1$ is greater than the initial bit error rate $BER_i$. If not, the procedure advances to step 354 and to the vertical course delay routine (FIG. 9).

If the new bit error rate $BER_1$ is greater than the initial bit error rate $BER_i$ the procedure advances to step 356. In step 356, the horizontal delay adjuster 80 is operated to cause the horizontal delay to decrease by two increments. This will cause a new bit error rate $BER_2$.

In step 358, a determination is made as to whether the new bit error rate $BER_2$ is less than the initial bit error rate $BER_i$. If not, the procedure advances to step 354.

If the new bit error rate $BER_2$ is less than the initial bit error rate $BER_i$, the procedure advances to step 360.

In step 360 the horizontal delay adjuster 80 is operated to decrease the horizontal delay by one increment. This should cause a change in the magnitude of the bit error rate to $BER_3$.

In step 362, a determination is made as to whether the new bit error rate $BER_3$ is less than the previous bit error rate $BER_2$. If not, the procedure advances to step 354. If the new bit error rate $BER_3$ is less than the previous bit error rate $BER_2$, the procedure advances to step 364 which is similar to steps 314 and 344 and provides incremental adjusting of the delay adjuster 80 to continue until the new bit error rate $BER_N$ is equal to or greater than $BER_{N-1}$ and the procedure advances to the vertical course delay routine (FIG. 9).

Reference is now made to FIG. 9 which illustrates the vertical course delay routine 210.

In this routine, the vertical delay adjuster 54 is operated to increase the vertical delay by one increment in step 400. This should cause a new bit error rate $BER_1$.

As in the previous discussions relative to FIGS. 6, 7 and 8, the first vertical delay increment adjustment will result in a new bit error rate $BER_1$ and as additional adjustments are made the bit error rates are referred to hereinafter as bit error rates $BER_2 \ldots$ through $BER_N$. Also, the initial bit error rate $BER_i$ employed in the vertical delay routine may have a value corresponding with the last value of the bit error rate in the immediately preceding horizontal delay routine 208.

In step 402, a determination is made as to whether the new bit error rate $BER_1$ is greater than the initial bit error rate $BER_i$. If not, this ends the procedure at step 404.

If the new bit error rate $BER_1$ is greater than the initial bit error rate $BER_i$ in step 402, the procedure advances to step 406. In this step, the vertical delay adjuster 54 is operated to cause the vertical delay to be decreased by two increments. This should cause a change in the value to a new bit error rate $BER_2$.

In step 408 a determination is made as to whether the new bit error rate $BER_2$ is less than the initial bit error rate $BER_i$. If not, the procedure ends at step 404.

If the new bit error rate $BER_2$ is less than the initial bit error rate $BER_i$ the procedure advances to step 410. In step 410, the vertical delay adjuster 54 is operated so as to decrease the vertical delay by one increment. This should cause a new bit error rate $BER_3$.

In step 412, a determination is made as to whether the new bit error rate $BER_3$ is less than the previous bit error rate $BER_2$. If not, the procedure ends at step 404.

If the new bit error rate $BER_3$ is less than the previous bit error rate $BER_2$, the procedure advances to step 414 during which the vertical delay adjuster 54 is operated to continue the incremental adjusting for decreasing the vertical delay by one increment with each adjustment until a determination is made that $BER_N$ is equal to or greater than $BER_{N-1}$.

Although the invention has been described in conjunction with a preferred embodiment, it is to be appreciated that various modifications may be made without departing from the spirit and scope of the invention as defined by the appended claims.

Having described the invention I claim:

1. An antenna system for receiving horizontal and vertical components of a transmitted horizontally polarized digital RF signal comprising:

a vertical antenna primarily receiving said vertical components of said RF signal;

a horizontal antenna primarily receiving said horizontal components of said RF signal;

an adjustable time delay adjuster for decreasing any time delay between said received components;

a combiner for combining the components to obtain therefrom a combined RF signal for application to an RF utilization means;

said combined RF signal being a digital signal exhibiting a bit error rate dependent upon the value of said vertical component;

an RF decoder for decoding said bit error rate and providing a bit error rate signal having a value that varies as a function of the value of said bit error rate; and, an adaptive controller responsive to said bit error rate signal for adjusting said adjuster in a direction to decrease said bit error rate.

2. An antenna system for receiving horizontal and vertical components of a transmitted horizontally polarized digital RF signal comprising:

a vertical antenna primarily receiving said vertical components of said RF signal;

a horizontal antenna primarily receiving said horizontal components of said RF signal;

an adjustable time delay adjuster for adjusting any time delay between said received components;

a combiner for combining the components to obtain therefrom a combined RF signal for application to an RF utilization means;

said combined RF signal being a digital signal exhibiting a bit error rate dependent upon the value of said vertical component;

an RF decoder for decoding said bit error rate and providing a bit error rate signal having a value that varies as a function of the value of said bit error rate;

an adaptive controller responsive to said bit error rate signal for adjusting said adjuster in a direction to decrease said bit error rate; and wherein said combiner combines said components in such a manner to cause phase shifting of said vertical component so that said combined RF signal is mainly a horizontal component.

3. An antenna system as set forth in claim 1 wherein said controller includes a computer programmed for receiving said bit error rate signal having an initial value of bit error rate $BER_i$ and adjusting said adjuster to increase said time delay by a given increment causing said bit error rate to be changed to bit error rate $BER_1$.

4. An antenna system as set forth in claim 3 wherein said controller determines whether said bit error rate $BER_1$ is greater than $BER_i$ and if so then adjusts the adjuster to decrease said time delay by two given increments causing said bit error rate to be changed to bit error rate $BER_2$.

5. An antenna system as set forth in claim 4 wherein said controller determines whether said bit error rate $BER_2$ is less than bit error rate $BER_i$ and if so then adjusts said adjuster to decrease said time delay by one said given increment.

6. An antenna system as set forth in claim 5 wherein said controller determines whether said bit error rate $BER_3$ is less than bit error rate $BER_2$ and if so then adjusts said adjuster to decrease said time delay by one said given increment.

7. An apparatus as set forth in claim 6 wherein said controller incrementally adjusts said adjuster by one given increment each time to continuously decrease said time delay until the bit error rate $BER_N$ is equal to or greater than the next preceding bit error rate $BER_{N-1}$.

8. An antenna system for receiving horizontal and vertical components of a transmitted horizontally polarized digital RF signal comprising:

a vertical antenna primarily receiving said vertical components of said RF signal;

a horizontal antenna primarily receiving said horizontal components of said RF signal;

an adjustable time delay adjuster for decreasing any time delay of said received horizontal component;

a combiner for combining said adjusted horizontal component and said vertical component to obtain therefrom a combined RF signal for application to an RF utilization means;

said combined RF signal being a digital signal exhibiting a bit error rate dependent upon the value of said vertical component;

an RF decoder for decoding said bit error rate and providing a bit error rate signal having a value that varies as a function of the value of said bit error rate; and, an adaptive controller responsive to said bit error rate signal for adjusting said adjuster in a direction to decrease said bit error rate.

9. An antenna system for receiving horizontal and vertical components of a transmitted horizontally polarized digital RF signal comprising:
   a vertical antenna primarily receiving said vertical components of said RF signal;
   a horizontal antenna primarily receiving said horizontal components of said RF signal;
   an adjustable time delay adjuster for adjusting any time delay of said received horizontal component;
   a combiner for combining said adjusted horizontal component and said vertical component to obtain therefrom a combined RF signal for application to an RF utilization means;
   said combined RF signal being a digital signal exhibiting a bit error rate dependent upon the value of said vertical component;
   an RF decoder for decoding said bit error rate and providing a bit error rate signal having a value that varies as a function of the value of said bit error rate;
   an adaptive controller responsive to said bit error rate signal for adjusting said adjuster in a direction to decrease said bit error rate; and
   wherein said combiner combines said components in such a manner that said vertical component is phase shifted so that said combined RF signal is mainly a horizontal component.

10. An antenna system as set forth in claim 9 wherein said controller includes a computer programmed for receiving said bit error rate signal having an initial bit error rate $BER_i$ and adjusting said adjuster to increase said time delay by a given increment causing said bit error rate to be changed to bit error rate $BER_1$.

11. An antenna system as set forth in claim 10 wherein said controller determines whether said bit error rate $BER_1$ is greater than $BER_i$ and if so then adjusts the adjuster to decrease the said time delay by two given increments causing said bit error rate to be changed to bit error rate $BER_2$.

12. An antenna system as set forth in claim 11 wherein said controller determines whether said bit error rate $BER_2$ is less than bit error rate $BER_i$ and if so then adjusts said adjuster to decrease said time delay by one said given increment.

13. An antenna system as set forth in claim 12 wherein said controller determines whether said bit error rate $BER_3$ is less than bit error rate $BER_2$ and if so then adjusts the adjuster to decrease said time delay by one said given increment.

14. An apparatus as set forth in claim 13 wherein said controller incrementally adjusts said adjuster by one given increment each time to continuously decrease said time delay until the bit error rate $BER_N$ is equal to or greater than the next preceding bit error rate $BER_{N-1}$.

15. An antenna system for receiving horizontal and vertical components of a transmitted horizontally polarized digital RF signal comprising:
   a vertical antenna primarily receiving said vertical components of said RF signal;
   a horizontal antenna primarily receiving said horizontal components of said RF signal including a horizontal component;
   an adjustable time delay adjuster for decreasing any time delay of said received vertical component;
   a combiner for combining said adjusted vertical component and said horizontal component to obtain therefrom a combined RF signal for application to an RF utilization means;
   said combined RF signal being a digital signal exhibiting a bit error rate dependent upon the value of said vertical component;
   an RF decoder for decoding said bit error rate and providing a bit error rate signal having a value that varies as a function of the value of said bit error rate; and,
   an adaptive controller responsive to said bit error rate signal for adjusting said adjuster in a direction to decrease said bit error rate.

16. An antenna system for receiving horizontal and vertical components of a transmitted horizontally polarized digital RF signal comprising:
   a vertical antenna primarily receiving said vertical components of said RF signal;
   a horizontal antenna primarily receiving said horizontal components of said RF signal including a horizontal component;
   an adjustable time delay adjuster for adjusting any time delay of said received vertical component;
   a combiner for combining said adjusted vertical component and said horizontal component to obtain therefrom a combined RF signal for application to an RF utilization means;
   said combined RF signal being a digital signal exhibiting a bit error rate dependent upon the value of said vertical component;
   an RF decoder for decoding said bit error rate and providing a bit error rate signal having a value that varies as a function of the value of said bit error rate;
   an adaptive controller responsive to said bit error rate signal for adjusting said adjuster in a direction to decrease said bit error rate; and
   wherein said combiner combines said components in such a manner that said adjusted vertical component is phase shifted so that said combined RF signal is mainly a horizontal component.

17. An antenna system as set forth in claim 16 wherein said controller includes a computer programmed for receiving said bit error rate signal having an initial bit error rate $BER_i$ and adjusting said adjuster to increase said time delay by a given increment causing said bit error rate to be changed to bit error rate $BER_1$.

18. An antenna system as set forth in claim 17 wherein said controller determines whether said bit error rate $BER_1$ is greater than $BER_i$ and if so then adjusts the adjuster to decrease the said time delay by two given increments causing said bit error rate to be changed to bit error rate $BER_2$.

19. An antenna system as set forth in claim 18 wherein said controller determines whether said bit error rate $BER_2$ is less than bit error rate $BER_i$ and if so then adjusts said adjuster to decrease said time delay by one said given increment.

20. An antenna system as set forth in claim 19 wherein said controller determines whether said bit error rate $BER_3$ is less than bit error rate $BER_2$ and if so then adjusts the adjuster to decrease said time delay by one said given increment.

21. An apparatus as set forth in claim 20 wherein said controller incrementally adjusts said adjuster by one given increment each time to continuously decrease said time delay until the bit error rate $BER_N$ is equal to or greater than the next preceding bit error rate $BER_{N-1}$.

\* \* \* \* \*